United States Patent [19]
Magne

[11] Patent Number: 5,678,616
[45] Date of Patent: Oct. 21, 1997

[54] FIXED INSTALLATION FOR FILLING AIRCRAFT WITH FUEL

[75] Inventor: Michel Magne, Paris, France

[73] Assignee: Elf Antar France, Courbevoie, France

[21] Appl. No.: 634,842

[22] Filed: Apr. 19, 1996

[30] Foreign Application Priority Data

May 4, 1995 [FR] France ................. 95-05341

[51] Int. Cl.[6] .................................. B65B 1/04
[52] U.S. Cl. .................. 141/387; 141/279; 137/615
[58] Field of Search ..................... 141/388, 387, 141/279; 244/135 R, 135 A; 137/615, 342

[56] References Cited

U.S. PATENT DOCUMENTS

| | | |
|---|---|---|
| 3,891,004 | 6/1975 | Knight . |
| 4,570,673 | 2/1986 | Kendrick et al. ............... 137/615 |
| 4,844,133 | 7/1989 | Von Meyerinck et al. ......... 141/387 |
| 4,883,229 | 11/1989 | Moeller . |
| 4,898,211 | 2/1990 | Fornier et al. ................ 141/387 |
| 4,993,463 | 2/1991 | Meyerinck et al. . |
| 5,505,237 | 4/1996 | Magne . |

FOREIGN PATENT DOCUMENTS

| | | |
|---|---|---|
| 0 621 175 | 10/1994 | European Pat. Off. . |
| 2 448 496 | 9/1980 | France . |

Primary Examiner—Robert M. Fetsuga
Assistant Examiner—Steven O. Douglas
Attorney, Agent, or Firm—Oblon, Spivak, McClelland, Maier & Neustadt, P.C.

[57] ABSTRACT

A fixed installation is placed close to at least one aircraft parking area. The installation includes a pipe connected to the system. Said pipe is routed into a fixed base erected on the ground and then into an articulated structure. Its extremity for connection to the aircraft is mounted on a pod vertically mobile at the extremity of the articulated structure. The chassis rests on the ground by means of orientable driving wheels whose drive controls the deployment and folding of the structure. When deployed, this structure forms a bridge permitting the passage of vehicles.

13 Claims, 3 Drawing Sheets

5,678,616

FIXED INSTALLATION FOR FILLING AIRCRAFT WITH FUEL

FIELD OF THE INVENTION

The invention concerns a fixed installation for filling aircraft with fuel from an under-pressure fuel distribution system existing on the airport.

This installation can be used in any airport having an under-pressure fuel distribution system.

BACKGROUND OF THE INVENTION

The fuelling techniques currently used on airports are of two types.

One first technique concerns airports equipped with an under-pressure fuel distribution system having pressure tappings situated close to the aircraft parking areas.

According to this first fuelling technique, small lorries known as <<servers>> are used to ensure the transfer of the under-pressure fuel into the tanks of the aircraft. These small lorries are equipped in such as way that they are able to fully preserve the properties of the fuel and allow for easy transfer in perfect safety of said fuel into the tanks. To this effect, they are normally equipped with control systems, valves, flexible pipes, an elevating platform, etc.

Although currently used in a large number of airports, this first fuelling technique does have significant drawbacks.

Thus, the servers need to have sources of energy, especially hydraulic and pneumatic, whose implementation requires the functioning of the server motor be maintained throughout the period of fuelling. From the point of view of safety, this is clearly not satisfactory.

Furthermore, the servers are complex engines which need to continuously move from one point to another in the airports, which creates a potential risk of accidents occurring, either with other service vehicles or with the aircraft themselves. From both the point of view of safety and and ecological point of view, this is clearly not satisfactory.

In addition, the distribution of fuel by means of the server is normally carried out by a sole operator who controls all the operations. This operator thus needs to monitor the aircraft, the lorry and also the intense activity going on around the aircraft at the time of fuelling. When fuelling has finished, the operator is therefore unable to react at the right time and a significant amount of fuel is likely to get poured onto the ground. From an ecological or financial point of view, this is clearly not satisfactory.

The second currently used fuelling technique, which is the most commonly used technique, concerns all types of airports and in particular those not equipped with any under-pressure fuel distribution system.

This second technique consists of using watertank lorries known as <<bowsers>> or fuelling vehicles. These lorries include equipment items similar to those on the servers, as well as one or several capacitors embarked on the vehicle. They need to move continuously between the airport warehouse used to store hydrocarbides close to the air terminal and the aircraft parking areas.

Given the fact that their equipment items are similar to those of the servers, the bowsers have the same drawbacks as the latter and aggravated by the fact that they carry large quantities of fuel (generally between 20,000 and 80,000 liters).

In addition to these currently used fuelling techniques, it has also been considered, especially in the document FR-A-2 417 712, to directly provide the link between a fixed pressure tapping belonging to an under-pressure fuel distribution system and the tanks of the aircraft by means of a flexible pipe which is wound onto a coil when not used.

This particularly simple solution does not exhibit the risks of the two currently used conventional techniques. However, the heavy traffic occurring around aircraft on airports results in an extremely rapid wear of the flexible pipes which need to be replaced frequently. Moreover and more seriously, there is a significant risk in that the flexible pipe being pulled away by a vehicle, this proving to be unsatisfactory, both as regards safety and from an ecological point of view.

Finally, the document U.S. Pat. No. 4,993,463 suggests connecting onto a fixed pressure tapping of an under-pressure fuel distribution system an articulated pipe able to be retracted into the ground when not used. The deployment of this pipe enables the aircraft to be filled with fuel.

Owing to its rigid nature, the pipe connecting the pressure tapping to the aircraft constitutes an almost insurmountable obstacle for the large number of vehicles moving backwards and forwards close to the aircraft parking area, this clearly not being desirable for the fluid movement of traffic and also may risk causing a major accident. Moreover, the rigid nature of the segments making up the articulated pipe limits the use of this technique to certain types of aircraft for which the pipe has previously been dimensioned.

SUMMARY OF THE INVENTION

The invention concerns a fixed installation able to fill aircraft of any type with fuel from an under-pressure fuel distribution system without having the risks of accidents inherent in known techniques and without interfering with the traffic of vehicles close to the aircraft.

In accordance with the invention, this result is obtained by using a fixed installation for filling aircraft with fuel from an under-pressure fuel distribution system, wherein it includes:

A fixed base erected on the ground close to at least one aircraft parking area;

At least one articulated structure, one of its extremities being supported in a pivoting way by the fixed base around a first vertical pin so as to be able to be deployed horizontally from a folded idle condition into a deployed fuelling state authorising a passage of vehicles under said structure;

A driving element comprising at least one orientable driving wheel by which the second extremity of the articulated structure rests on the ground;

A pod mounted on the second extremity of the articulated structure so as to be able to move between a low idle and displacement position to an upper fuelling position, and A pipe mounted on the fixed base and each articulated structure whose first extremity is connected to the distribution system and whose second extremity linked to the pod bears at least one member for connection to the aircraft.

In one preferred embodiment of the invention, the articulated structure includes two rigid horizontal sections of approximately the same length and joined together by a second vertical pin in the way of a compass. These sections are placed at a height which authorises the passage of vehicles on the ground. In this case, the extremity of one of the sections opposite the second vertical pin forms the first extremity of the articulated structure, whereas the extremity of the second section opposite the second vertical pin is extended downwards by a frame which forms the second extremity of the articulated structure. This frame rests on the ground via the orientable driving wheel around a third vertical pin.

In the folded idle position of the articulated structure, the two sections are preferably placed opposite the parking area served by this structure with respect to the fixed base. This characteristic makes in particular it possible to have the pod in the best possible orientation with respect to the leading edge of the flying surface of aircraft without risking striking the motors.

In the preferred embodiment of the invention, the pipe includes three rigid pipe sections routed respectively into the fixed base and into each of the sections of the articulated structure. The pipe further includes two rotary connectors connecting end-to-end these pipe sections. These rotary connectors define two vertical pins which are respectively merged with the first and second vertical pins defined previously.

In addition, the pipe also includes a flexible pipe section connecting the rigid pipe sections to at least one flexible lengthening piece borne by the pod and ended by the connection member.

Two articulated structures are preferably mounted on the same base.

Depending on the case, the fixed base may be formed of either a pole erected between two aircraft parking areas, or by a pillar on which a bridge is also joined ensuring the transfer of passengers, or finally by an extension of the air terminal.

The motor element preferably includes two wheels mounted on a common axle and independent motors associated with each of the wheels. Means for controlling these motors are then mounted on the pod.

The operator who pilots the installation is preferably embarked on the pod which then supports at least one adjusting valve mounted on the pipe so as to distribute the fuel, at least one control for emergency halting this distribution, an indicator for indicating the volume of fuel delivered, and at least one alarm.

Finally, the connection of the first extremity of the pipe on the distribution system is effected in a caisson placed on the ground immediately close to the fixed base. This caisson contains means for controlling, regulating and measuring fuel feeding.

BRIEF DESCRIPTION OF THE DRAWINGS

There now follows a non-restrictive example of one preferred embodiment of the invention with reference to the accompanying drawings on which.

DETAILED DESCRIPTION OF THE PREFERRED EMBODIMENTS

Figure 1:
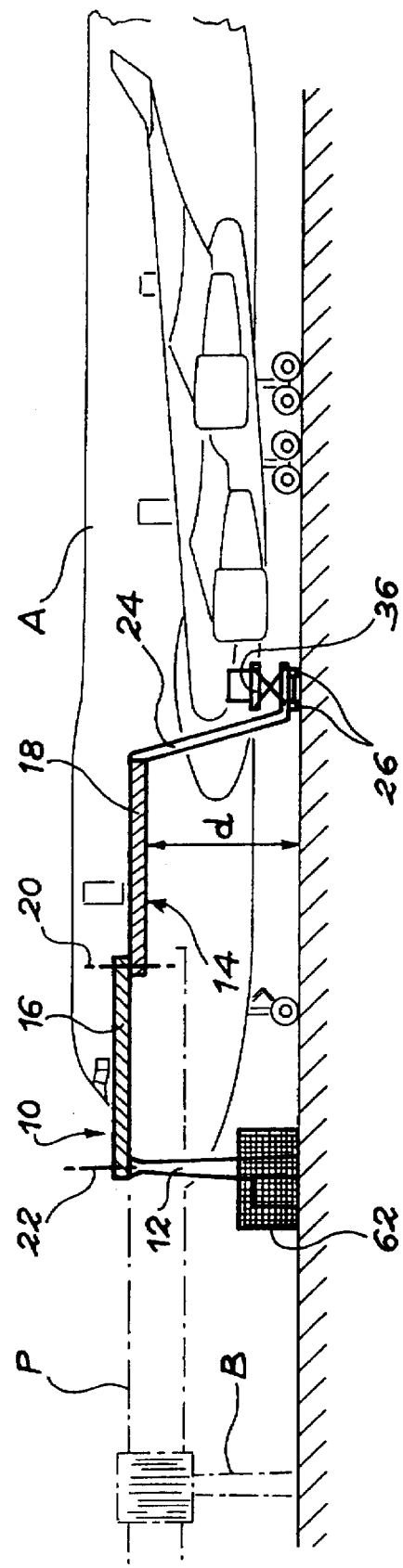
FIG. 1 is a side view diagrammatically showing a fuelling installation conforming to the invention in the position it occupies when fuelling a plane, the bridge for transferring passengers being diagrammatically shown by the dot-and-dash lines.
Figure 2:
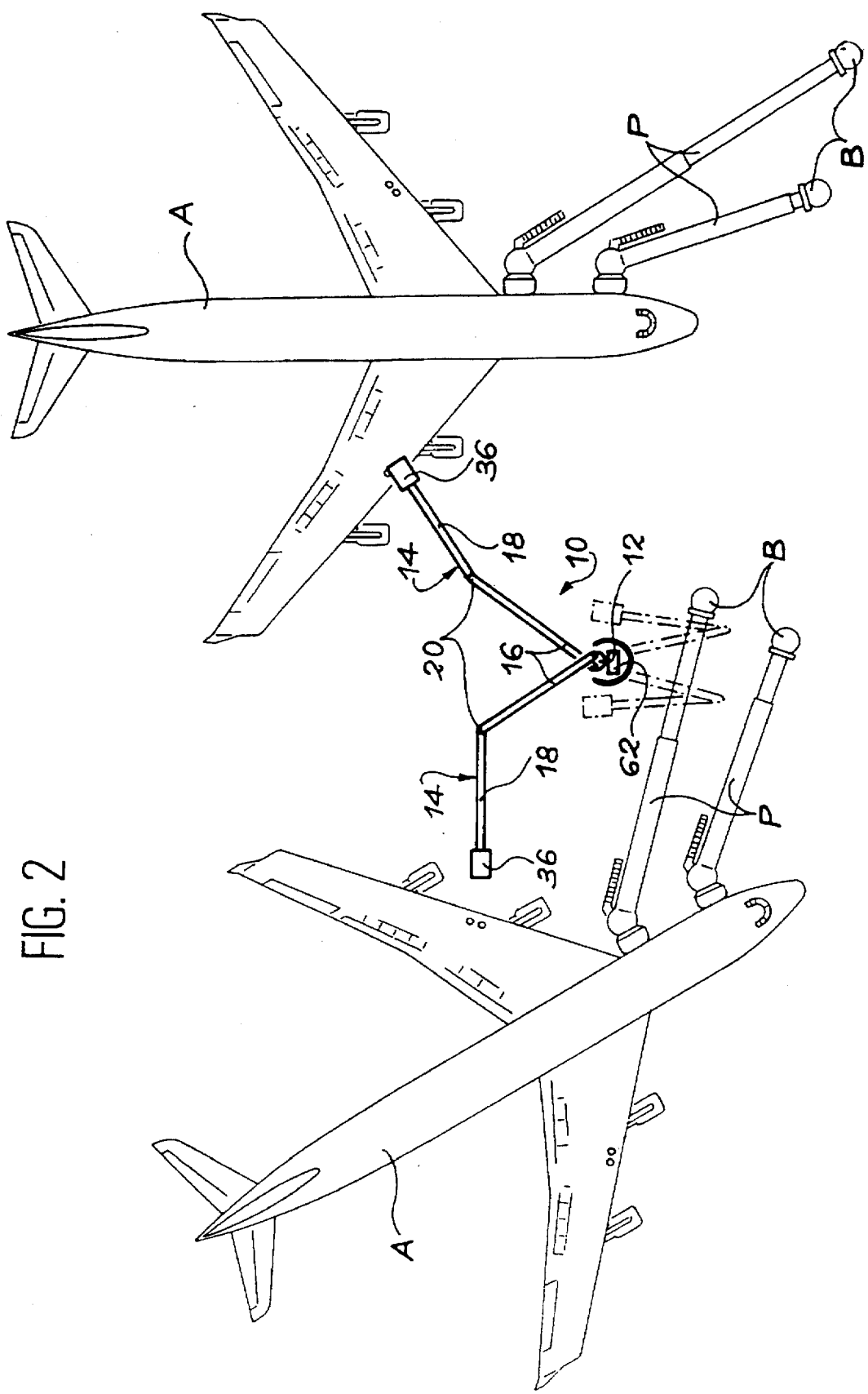
FIG. 2 is a top view diagrammatically showing the simultaneous fuelling of two aircraft from a given installation conforming to the invention.

On FIGS. 1 and 2, the reference 10 generally denotes a fixed fuel filling installation installed on an airport close to two parking areas. Each of these parking areas is able to accomodate an aircraft A of any particular type.

The fixed fuelling installation 10 is provided to be installed on an airport equipped with an under-pressure fuel distribution system (not shown). This system, not forming part of the invention, is able to route the fuel required for fuelling aircraft close to their parking areas. It includes underground pipes equipped with pressure tappings situated close to said parking areas. The fixed fuelling installation 10 is connected to one of these pressure tappings.

FIGS. 1 and 2 also diagrammatically show bridges P enabling passengers to move between the aircraft A and the air terminal (not shown). These conventional bridges P are generally telescopic and joined on the side of the air terminal to a pillar B resting on the ground.

The fixed fuelling installation 10 of the invention has been designed so as to be able to simultaneously carry out the feeding with fuel of aircraft placed on two neighbouring parking areas. It is to be noted that in one variant, a similar installation could be placed close to a single parking area so as to be able to feed a single aircraft with fuel.

Figure 3:
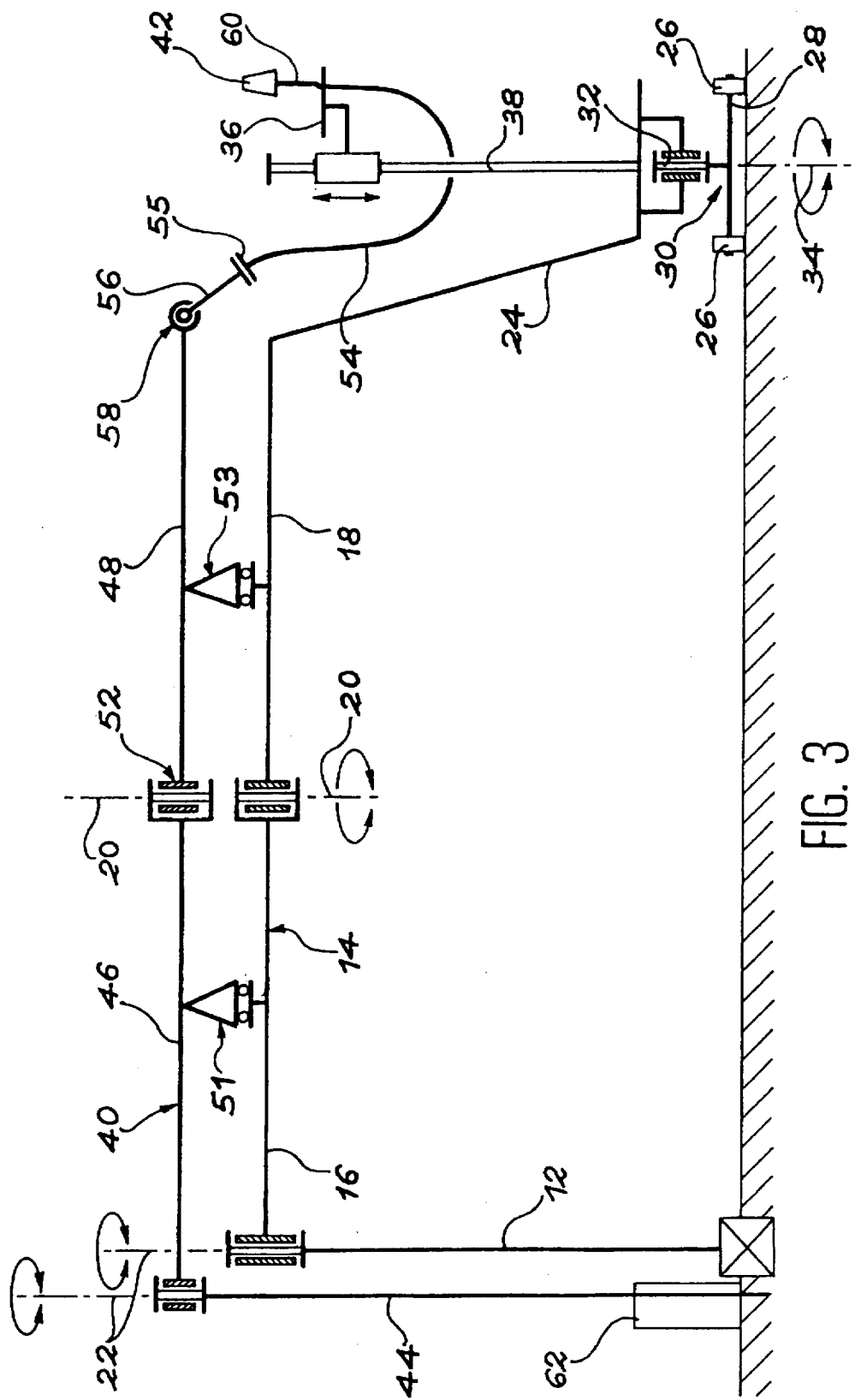
FIG. 3 is a kinematics diagram illustrating in more detail the various elements constituting the fuelling installation of the invention.

The installation 10 mainly includes a mechanical portion and a hydraulic portion to be described successively with reference to FIGS. 1 to 3.

The mechanical portion of the fixed fuelling installation 10 first of all includes a fixed base 12 erected on the ground immediately close to the pressure tapping closest to said two parking areas. In the embodiment shown, the fixed base 12 is formed of a pole erected directly between the two parking areas for the planes A immediately close to the pressure tapping.

In one embodiment variant (not shown), the fixed base 12 is directly formed by the articulation pillar B of the bridge P closest to the pressure tapping in question.

In another embodiment variant (not shown), the fixed base 12 may be formed of an extension of the air terminal.

In the embodiment shown, the mechanical portion of the installation 10 further includes two articulated structures 14 (FIG. 2) able to respectively serve the tanks of the aircraft A situated in the semi-wing units of these planes closest to the fixed base 12. Where the installation is intended for fuelling a single aeroplane, it naturally only includes a single articulated structure 14. A first extremity of each articulated structure 14 is supported pivoting by a first vertical pin 22 at the top of the fixed base 12.

Given the fact that the articulated structures 14 and the elements associated with them are produced totally identically, only one of these structures and its associated elements shall now be described.

In its preferred embodiment shown on FIGS. 1 to 3, each articulated structure 14 includes two rigid approximately rectilinear sections 16 and 18 disposed horizontally at a distance d above the ground (FIG. 1). This distance d is sufficient to allow for the passage of runway vehicles below the articulated structure 14, especially when the latter is deployed as shown on the figures.

More specifically, the sections 16 and 18 of the articulated structure 14 have approximately the same length. These two sections 16 and 18 are joined together by a second vertical pin 20 so that the articulated structure 14 warps horizontally in the way of a compass.

The first extremity of the articulated structure 14, which is joined to the top of the fixed base 12 by the first vertical pin 22, is formed by the extremity of the section 16 opposite the second hinge pin 20. Owing to this disposition, the articulated structure 14 is able to occupy a folded back idle position shown by the dot-and-dash lines on FIG. 2, and a deployed fuelling position shown by the full lines on FIGS. 1 and 2.

In the folded back idle position, the two sections 16 and 18 of the articulated structure 14 are folded against each other opposite the served parking area with respect to the fixed base 12 by pivoting around the first and second hinge pins 22 and 20. The extremity of the articulated structure 14 opposite the one by which this structure is joined to the fixed base 12 is then located immediately close to the latter. In these circumstances, the installation occupies a minimum space which hardly hinders the movement of runway vehicles, especially when the articulated structure 14 is then always located at the height d above the ground.

So as to avoid any risk of interference between the articulated structure 14 when folded back and the bridges, the distance d shall be given as far as possible a value slightly greater than the maximum height of each of the bridges P. However, it is to be noted that each interference is normally rendered impossible by the fact that the bridges themselves are normally folded back.

Moreover, in the deployed fuelling position of the articulated structure 14, the latter forms a bridge whose dimensioning authorises the passage of runway vehicles. This characteristic is shown on FIG. 1.

It is to be noted that the dimensions of the two sections 16, 18 of the articulated structure 14 need to be determined so that, regardless of the type of aircraft A parked on the parking area served by this structure, the sections 16, 18 are never aligned when seen from above (FIG. 2). This condition may in particular be ensured by providing on the articulation connecting the sections 16 and 18 an end-of-travel stop limiting the opening angle, to a value of less than 180°.

As diagrammatically shown on FIG. 1, the second section 18 of the articulated structure 14 is extended downwards by a rigid frame 24 which may be fixed to either the free extremity of the second section 18, or formed of a single piece along with this section. This frame 24 comprises a vertically orientated or slightly slanted portion, as shown on FIG. 1, as well as an approximately horizontal low portion. This low portion of the frame 24 rests on the ground by two orientable driving wheels 26 borne by a given axle 28, as shown on FIG. 3.

The axle 28 and the driving wheels 26 it supports belong to a driving element 30 mounted on the horizontal low portion of the frame 24. This driving element 30 further includes a vertical column 32 integral with the axle 28 and by which the driving element is mounted pivoting on the low horizontal portion of the frame 24 around a third vertical pin 34.

The driving element 30 further includes two motors (not shown) respectively associated with each of the driving wheels 26 and whose control is carried out separately. This disposition allows for a movement of the low horizontal portion of the frame 24 forming the extremity of the articulated structure 14 along any path enabling the operator to provide at will the deployment and folding back of the articulated structure in satisfactory conditions.

It is to be noted that the driving element 30 could be produced differently without departing from the context of the invention. Thus, the unit formed by the two driving wheels 26 and the axle 28 supporting them may be replaced by two twin wheels.

The frame 24 supports, for example via its low horizontal portion as shown on FIG. 3, a pod 36 able to move along a vertical or approximately vertical direction between a lower position and an upper position.

The pod 36 normally occupies its lower position when the articulated structure 14 is folded back and when it is moving. On the other hand, it occupies its upper position when the aircraft is being filled with fuel.

The control and guiding of movement of the pod 36 between its upper position and its lower position may be carried out by any suitable device. Therefore and solely by way of example, the pod 36 may be mounted on vertical guides 38 borne by the lower horizontal portion of the frame 24 and on which the pod 36 slides, as diagrammatically shown on FIG. 3. The control of movement is then ensured, for example, by a pinion mounted on the output shaft of a motor (not shown) embarked on the pod, this pinion being geared on a rack borne by one of the guides 38.

As a variant, the guiding of the pod 36 between its upper and lower positions may be effected by directly mounting the pod on the linking portion of the frame 24 which connects the section 18 of the articulated structure 14 to the lower horizontal portion of the frame. The vertical guides 38 are then suppressed.

The pod 36 is preferably equipped in such a way as to enable a sole operator to ensure implementation of the fuelling installation 10 from this pod. To this effect, the pod 36 contains means (not shown) for controlling the motors which ensure the driving of the driving wheels 26. These control means may in particular appear in the form of an operating lever mounted on a console and whose activation makes it possible to simultaneously control at separately adjustable speeds the driving in rotation of each of the wheels 26 so as to ensure the deployment or folding back of the articulated structure 14 along a controlled path.

The pod 36 also supports a certain number of items of equipment to be described subsequently by means of which the operator is able to ensure the connecting of the installation to the tank filling orifices of the aircraft and then order and control filling.

In addition to the mechanical portion described above, the fixed fuelling installation of the invention comprises a hydraulic portion making it possible to connect the under-pressure fuel distribution system to one or several tanks of the aircraft and then order and control filling with fuel.

This hydraulic portion mainly includes a pipe 40 associated with each of the articulated structures 14. More specifically, each of the pipes 40 is mounted on the fixed base 12 and on the articulated structure 14 so that a first extremity of this pipe is connected to the pressure tapping of the under-pressure fuel distribution system and its second extremity is connected to the pod 36. In addition, this second extremity of the pipe 40 is fitted with a connecting member 42, generally known as a <<hooker>>, enabling it to be connected to the fuel filling orifice of the tank of the aircraft in question. The second extremity of the pipe 40 preferably bears two hookers 42 by means of which two aircraft tanks can be filled simultaneously.

As shown diagrammatically on FIG. 3, the pipe 40 comprises a first rigid pipe section 44 which is vertically routed into the fixed base 12, a second rigid pipe section 46 which is horizontally routed into the first section 16 of the articulated structure 145, and a third rigid pipe section 48 which is horizontally routed into the second section 18 of the articulated structure 14. So as to facilitate understanding concerning this figure, the connecting of the second rigid pipe section 44 is ensured by a rotary connector 50 whose vertical swivel pin is merged with the hinge pin 22, contrary to what is diagrammatically shown on FIG. 2. Similarly, the third rigid pipe section 48 is joined to the second rigid pipe section 46 by a rotary connector 52 whose hinge pin is merged with the hinge pin 20 of the second section 18 of the articulated structure 14 on the first section 16.

By means of the disposition described above, the deformations sustained by the articulated structure at the time it is deployed or being folded back do not generate any stresses on the pipes 40. Accordingly, any risk of any leak being generated by these deformations is avoided.

As diagrammatically shown at 51 and 53 on FIG. 3, the rigid pipe sections 46 and 48 respectively rest on the sections 16 and 18 of the articulated structure 14 by means of devices, such as rubber studs or guides mounted on roller bearings.

The pipe 40 is extended beyond the third rigid pipe section by a flexible pipe section 54. One first extremity of this flexible pipe section 54 is fixed by a flange, either directly to the extremity of the third rigid pipe section 48, or onto a short intermediate rigid section 56, the latter itself being connected to the extremity of the section 48 by a rotary connector 58 with a horizontal axis, as shown on FIG. 3. The other extremity of the flexible pipe section 54 is fixed to the pod 36 and connected to the hooker 42 by a flexible lengthening piece 60. In the preferred case mentioned earlier where the pod comprises two hookers 42, the extremity of the flexible pipe section 54 fixed to the pod 36 is extended by a Y-shaped pipe section whose two branches are themselves extended by two flexible lengthening pieces similar to the lengthening piece 60, each of these flexible lengthening pieces being ended by a hooker 42. So that the operator can control fuel distribution, each of the flexible lengthening pieces 60 is equipped with an adjusting valve (not shown).

The connecting of the first extremity of the pipe 40 to the pressure tapping of the under-pressure fuel distribution system is effected by means of a set of equipment known as a <<bundle>> housed in a caisson 62 which rests on the ground immediately close to the fixed base 12. The caisson 62 is placed on the pressure tapping of the system and in particular contains control means, adjustment means and fuel feeding measuring means. By way of example, these means may in particular include a regulation device with compensation of head losses, filtering means, counting means such as a turbine counter, pressure gauges and other indicators, sampling devices and line control sockets, as well as control and separation valves.

Because the command and control of fuelling are effected from the pod 36, a certain number of items of equipment of the bundle are connected to the latter by electric cables laid between the caisson 62 and the pod 36 with the pipe 40. This disposition makes it possible to implant emergency stop and distribution commands on the pod 36, as well as an indicator of the volume of fuel delivered and at least one sound and/or visual alarm.

As diagrammatically shown on the various figures, the installation described above can be implanted on any airport equipped with a fuel distribution system. It is able to ensure the fuelling of at least one plane and preferably two planes placed on neighbouring parking areas. It is important to note that the vertical mobility of the pod 36 and the shape given to the articulated structure 14 make it possible to fuel aircraft of any type with the same installation. Furthermore, this fuelling is effected risk-free without impeding the traffic of runway vehicles which normally drive around the aircraft. In addition, this fuelling can be ensured with the aid of a sole operator and by using the energy available on one or several platforms situated close to the installation, which considerably simplifies execution and again increases safety.

What is claimed is:

1. Fixed intallation for fuelling aircraft from an under-pressure fuel distribution system, wherein it includes:
   a fixed base erected on the ground close to at least one aircraft parking area;
   at least one articulated structure having a first and second extremity, wherein the first extremity is supported in a pivoting way by the fixed base around a first vertical pin so as to be able to be deployed horizontally from a folded idle position into a deployed fuelling state such that said articulated structure is elevated from the ground so as to allow for the passage of vehicles under said structure;
   a driving element comprising at least one orientable driving wheel by which the second extremity of the articulated structure rests on the ground;
   a pod mounted on the second extremity of the articulated structure so as to be able to move between a lower idle and displacement position to an upper fuelling position, and
   a pipe mounted on the fixed base and at least one articulated structure having a first extremity adapted to be connected to the distribution system and a second extremity linked to the pod and to at least one member adapted for connection to the aircraft.

2. Installation according to claim 1, wherein the articulated structure includes two rigid horizontal sections of approximately equal length and joined together by a second vertical pin.

3. Installation according to claim 2, wherein the extremity of one of the sections opposite the second vertical pin forms the first extremity of the structure, whereas the extremity of the other section opposite the second vertical pin is extended downwards by a frame forming the second extremity of the structure, said frame being connected to the orientable driving wheel around a third vertical pin.

4. Installation according to claim 2 or 3, wherein in the folded idle position of the articulated structure, the two sections are placed opposite the parking area served by this structure with respect to the fixed base.

5. Installation according to claim 4, wherein the pipe includes three rigid pipe sections respectively being routed into the fixed base and into each of the sections of the articulated structure, and two rotary connectors connecting end-to-end these pipe sections, these rotary connectors defining two vertical pins respectively merged with the first and second vertical pins.

6. Installation according to claim 5, wherein the pipe further includes a flexible pipe section connecting the rigid pipe sections to the pod and to the connection member.

7. Installation according to claim 1, wherein said at least one articulated structure is two articulated structures mounted on the fixed base.

8. Installation according to claim 1, wherein the fixed base is a pole erected between two aircraft parking areas.

9. Installation according to claim 1, wherein the fixed base is a pillar to which a passenger platform is also joined.

10. Installation according to claim 1, wherein the fixed base is an extension of the air terminal.

11. Installation according to claim 1, wherein the driving element includes two motorized wheels mounted on a common axle.

12. Installation according to claim 1, wherein the pod supports at least one adjustment valve mounted on the pipe for distributing fuel, an indicator indicating the volume of fuel delivered and at least one alarm.

13. Installation according to claim 1, wherein the connecting of the first extremity of the pipe to the distribution system is affected in a caisson placed on the ground immediately close to the fixed base and containing control, adjustment and fuel feed measuring means.

\* \* \* \* \*